Feb. 7, 1961 N. J. THOMPSON 2,970,845
MARKET CART WITH FOLDING SEAT
Filed Jan. 19, 1959 2 Sheets-Sheet 1
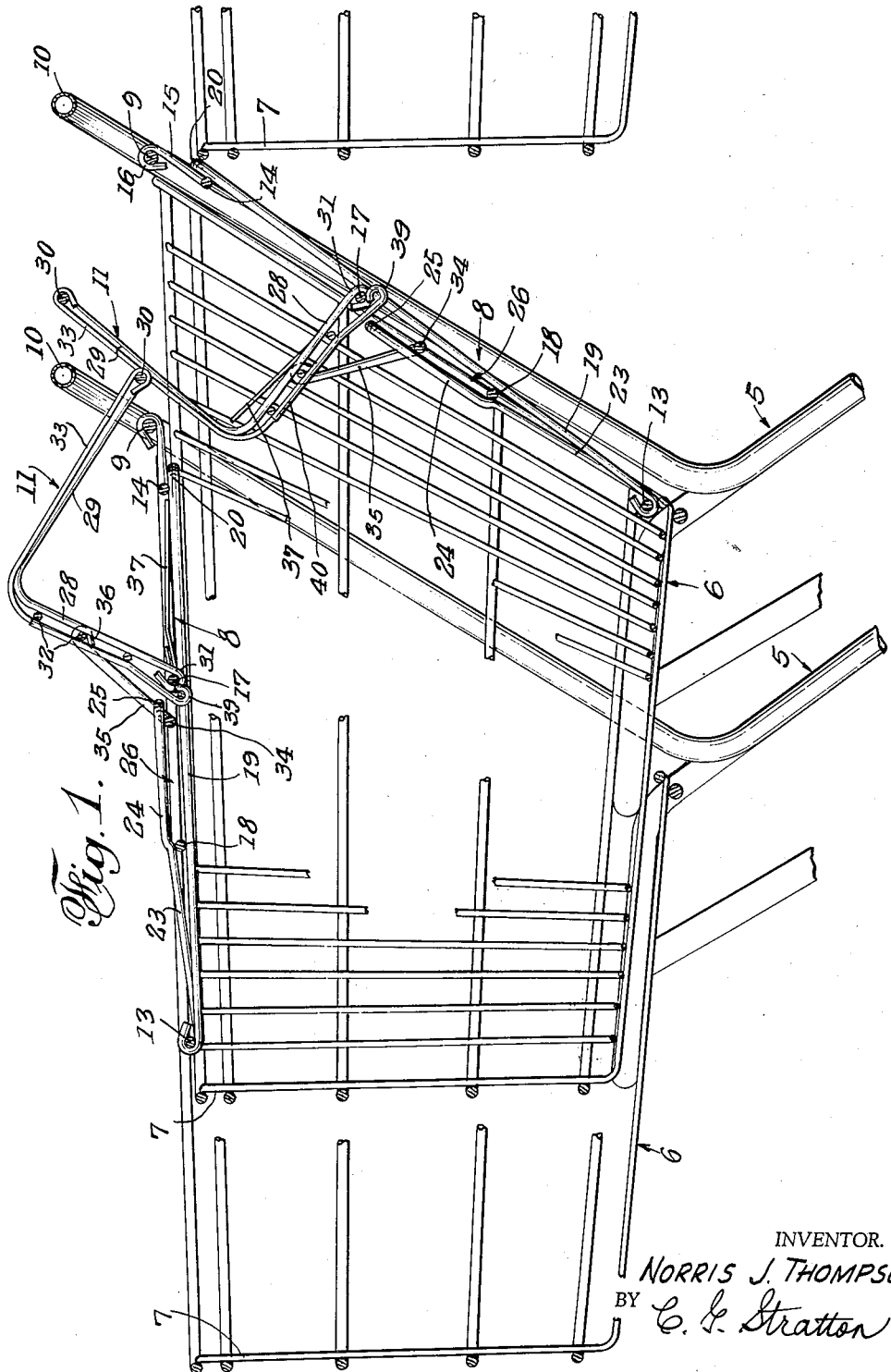
INVENTOR.
NORRIS J. THOMPSON
BY C. G. Stratton
ATTORNEY

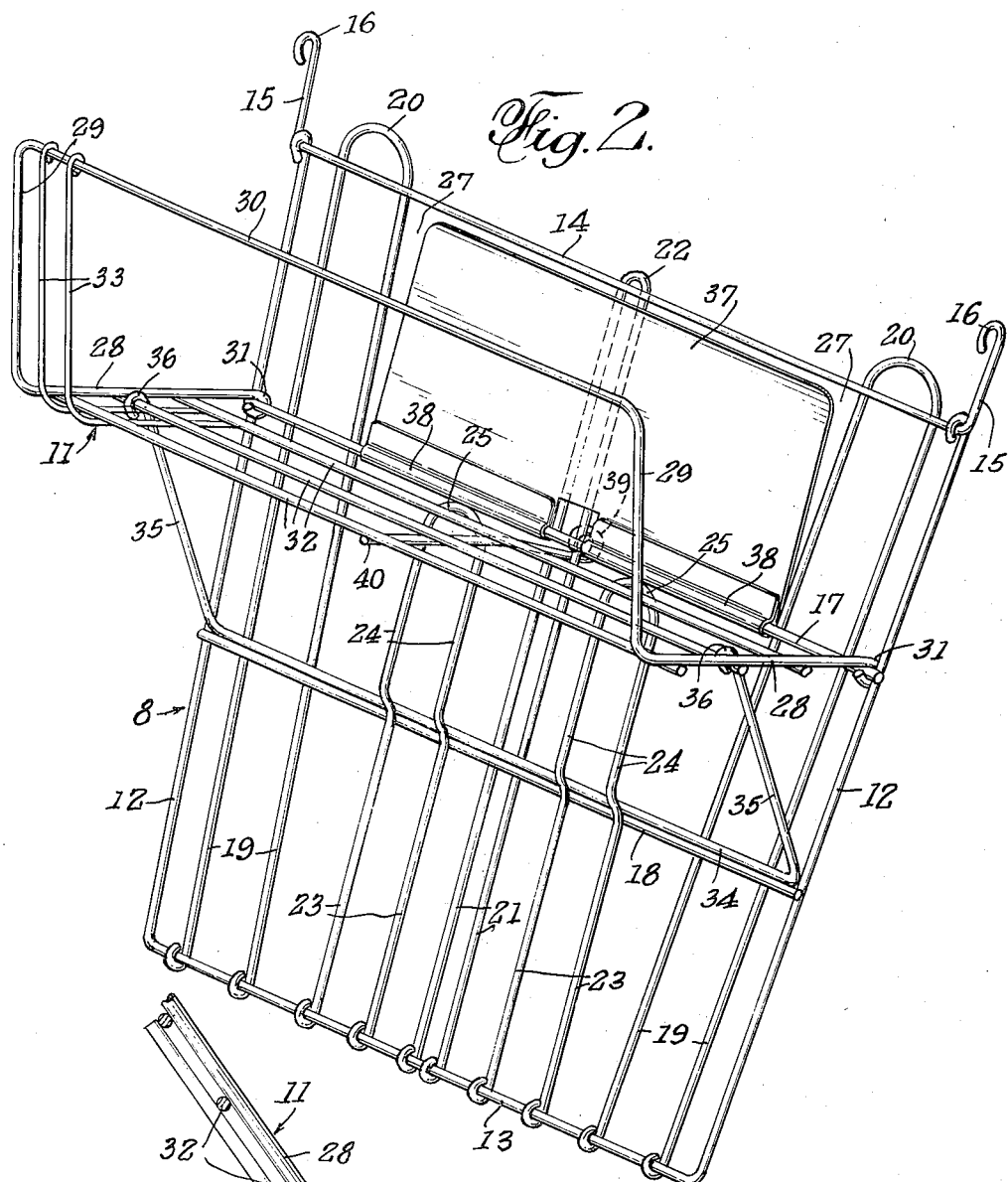

United States Patent Office 2,970,845
Patented Feb. 7, 1961

2,970,845

MARKET CART WITH FOLDING SEAT

Norris J. Thompson, Los Angeles, Calif.
(442 Fairview Ave., Arcadia, Calif.)

Filed Jan. 19, 1959, Ser. No. 787,629

6 Claims. (Cl. 280—33.99)

This invention relates to a market cart, the basket of which is provided with a child's seat.

An object of the present invention is to provide a cart of the character referred to that folds to allow nesting of the carts in space-saving relation.

Another object of the invention is to provide a cart structure that has an inwardly and upwardly swinging rear wall on which the seat is carried and is provided with means controlled by a nesting cart to fold the seat during such inward and upward swinging of the rear wall.

A further object of the invention is to provide a child's seat that although formed of wire is, nevertheless, rendered comfortable by the interposition of a hinged heat member.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a longitudinal sectional view showing portions of three market carts, two in nested position and the third in the process of being moved to nested position, said carts being provided with folding seats according to the present invention.

Fig. 2 is an enlarged perspective view of the rear wall of each cart with the seat thereon in goods-holding condition.

Fig. 3 is a further enlarged fragmentary detail view showing the manner of folding the seat during up-swinging of the rear wall.

The present market cart may be of conventional construction in that the same comprises a wheel-borne chassis 5 and a basket 6 extending forwardly from the chassis. It is common to have the baskets nest as shown. To this end, the forward end 7 of each basket 6 is of a size to freely enter the rear of another basket, said end causing the rear wall 8 to swing upwardly to come to rest upon the top of said other basket when nesting has been accomplished. Ordinarily, the wall 8 is carried on a pivot 9 adjacent the handle 10 of the cart. The present child's seat 11 is carried by the wall 8 so as to be disposed on the inside of the basket 6.

The rear wall 8 is conventionally formed of side wires 12 connected at the bottom end by a cross wire 13. An upper cross wire 14 connects the upper ends of wires 12 and terminates in ends 15 that form extensions of wires 12 and are bent as eyes 16 that connect with pivots 9. Intermediate cross wires 17 and 18 span across said wall parallel with wires 13 and 14.

Adjacent each side of the wall 8 are provided wires 19 coextensive with wires 12 and connected at their upper ends by loops 20 that extend above the cross wire 14. At the middle of wall 18 similar wires 21 are connected at their upper ends by a smaller loop 22.

Intermediate each pair of wires 19 and the wires 21, the wall 8 is provided with wires 23 that extend between wires 13 and 18. The upper ends 24 of wires 23 are offset inwardly and are connected by loops 25. In this manner, a slideway 26 is provided between the wall 8 and the wires 24. Since the loops 25 terminate below the cross wire 17, the wall 8 is provided with relatively large openings 27 flanking the wires 21 and between cross wires 14 and 17.

The seat 11 is hinged on wire 17 between an operative position, as in Fig. 2, and a folded position superposed on the wall 8. Said seat is formed of a frame wire having horizontal side portions 28, vertical side portions 29, and a transverse connecting portion 30 between the sides. The members 28 have eyes 31 that engage wire 17 and provide a hinge for the seat on the wall 8. Transverse wires 32 connect the side portions 28, and a complement of wires 33 extends between the connecting portion 30 of the frame wire and around and across the wires 32 to form a seat back as well as to reinforce the horizontal portion of the seat. Only two of the wires 33 are shown for purposes of clarity, it being evident that the remainder will be spaced along the seat from side to side.

The seat is supported in operative horizontal position by a bail-like prop having a cross-wire 34 that moves in the slideway 26 between wire 18 and the loops 25. The sides 35 of said prop extend from the ends of the cross-wire 34 and are formed to have eyes 36 that engage over one of the wires 32 adjacent to the seat side wires 28.

A thin sheet member 37 of limited resiliency is formed with eyes 38 extending around the wire 17, said member being of an areal size to largely cover the seat wires 32 when in a swung-down position, and substantially close the openings 27 when raised up, as in Fig. 2. Said member 37 may be made of sheet metal, or plastic, as desired. It will be clear that the same provides a comfortable seating surface, when swung down, and so closes openings 27, when raised, as to obviate accidental falling of items placed on the seat.

A rearward projection 39 is provided on a central member 40 that is secured to the under side of the seat, as to wires 32. Said projection is preferably rounded and extends rearwardly of and between the wall wires 21.

When two baskets 6 are to be nested, the front end of the rear basket will first encounter the wall 8 of the front basket. As the rear basket is pushed into the front basket, the wall 8 of the latter will swing upwardly on the pivot 9. The upper corner of the rear basket will, therefore, slide along the inwardly swinging wall 8 of the front basket, said wall assuming a position that approaches the horizontal, as shown in Fig. 3. Now, as the rear basket is continued to be pushed, said front corner of the rear basket will encounter the projection 39 and, by moving the same relative to the hinge wire 17, will tilt the seat so that the initially horizontal part of the seat falls to a superposed position on the now nearly horizontal wall 8. The back rest portion of said seat will project downwardly into the rear basket when the seat is thus folded over. The seat member 37 of the front basket will, of course, fall to the position of Fig. 1 across the openings 27. Upon separation of the baskets, the raised rear wall of the front basket will automatically fall to basket-closing position, but the seat will remain folded over until use thereof is desired, in which case the same is simply tilted to its operative position by its user.

When the seat of the rear basket encounters the downwardly projecting seat back of the front basket, the latter will partly raise, as shown in Fig. 1 but will fall back to folded position after the seat of the rear basket is raised and folded over by a third basket.

It will be evident that a child on the above-described seat will have his legs extending through the openings 27 and that there will be considerable space beneath the seat for storage of merchandise. It will also be evident that the seat member 37 comprises an impervious interceptor of unwanted moisture.

Since, in the great majority of instances, the seat is not used, the same returns with the hinged back wall to a folded position that offers maximum capacity of the basket for receiving goods. The downward swing of said back 8 is automatic upon separation of the baskets.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. In combination with a nesting market cart having a basket provided with a rear wall, the rear wall of the basket being hinged at its upper end to swing upwardly from a basket-closing position, a child support comprising a seat and a rigidly connected back, a pivot connecting said seat of said support and an intermediate portion of the rear wall whereby said support is entirely carried by said wall, means connected to the seat and engaged with the rear wall to hold the seat in child-supporting operative position, and a fixed projection on the seat adjacent said pivot and extending through and rearwardly of the rear wall and adapted to be engaged by a nesting cart to swing said child support from its operative support position to a non-operative pivotally raised position.

2. In combination with a nesting market basket according to claim 1, a pivoted sheet member movable independently of the support between a position over the seat of said support to a position superposed over the inner face of the rear wall.

3. In combination with the rear wall of a nesting market basket carried at its upper end by a hinge, a child support comprising a seat and a rigidly connected back, a hinge connecting the rearward edge of said seat with the rear wall, means interconnecting the rear wall and the seat forward of the hinge to hold the support in child-supporting operative position relative to the rear wall, and a rigid extension on said rearward edge of the seat and passing rearwardly through said rear wall and adapted to be engaged by the forward edge of a second market basket being telescopically nested therewith to swing the support on its pivot to a position over the top of the rear wall after said wall has been hingedly swung upwardly to leave an entry opening for the second market basket.

4. In combination with a hinged rear wall according to claim 3, a pivoted sheet member on the rear wall movable between a position on the seat and a position superposed over the inner face of the rear wall.

5. In combination with a nesting market cart having a basket provided with a rear wall, the rear wall of said basket being hinged at its upper end to swing upwardly from a basket-closing position, a support frame comprising a seat and rigidly connected back, a pivot connecting the seat of said frame and the rear wall, means to prop said frame in operative child-supporting position, a sheet member on the same pivot as the seat frame and independently movable between a position over the seat of said frame and a position superposed over the inner face of the rear wall, and a rigid projection on the seat adjacent said pivot extending through and rearwardly of the rear wall and adapted to be engaged by a nesting cart to pivot said seat from its operative position to the mentioned superposed position.

6. In the basket of a market cart having a rear wall mounted at its upper end to swing inwardly into the basket, a support comprising a rigidly connected seat and back, a hinge connecting the rearward edge of the seat and the rear wall intermediate its upper and lower ends, means to hold the support in child-supporting position and having sliding connection with the rear wall, and a rigid extension from said rearward edge of the seat extending through the rear wall when the support is in child-supporting position, said extension adapted to be pushed by the forward edge of a nesting market basket of a second cart to swing the support on its hinge upwardly from its child-supporting position and during upward swinging of the rear wall by said nesting basket edge.

References Cited in the file of this patent

UNITED STATES PATENTS

| | | |
|---|---|---|
| 2,662,775 | Goldman | Dec. 15, 1953 |
| 2,813,725 | Hoedinghaus et al. | Nov. 19, 1957 |
| 2,837,344 | Young | June 3, 1958 |
| 2,837,345 | Young | June 3, 1958 |
| 2,860,885 | Schweitzer | Nov. 18, 1958 |